United States Patent
Chu-Carroll et al.

(10) Patent No.: US 9,378,273 B2
(45) Date of Patent: Jun. 28, 2016

(54) SYSTEM AND METHOD FOR QUESTION ANSWERING BY REFORMULATING WORD PROBLEMS

(71) Applicant: International Business Machines Corporation, Armonk, NY (US)

(72) Inventors: Jennifer Chu-Carroll, Dobbs Ferry, NY (US); Adam P. Lally, Cold Springs, NY (US); Erik T. Mueller, Chevy Chase, MD (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 14/207,861

(22) Filed: Mar. 13, 2014

(65) Prior Publication Data

US 2015/0261849 A1    Sep. 17, 2015

(51) Int. Cl.
 *G06F 17/30* (2006.01)
 *G06F 17/27* (2006.01)

(52) U.S. Cl.
 CPC ...... *G06F 17/30654* (2013.01); *G06F 17/2775* (2013.01); *G06F 17/3064* (2013.01); *G06F 17/30675* (2013.01)

(58) Field of Classification Search
 CPC ............ G06F 17/30654; G06F 17/30684; G06F 17/30864; G06F 17/30389; G06F 17/2785; G06F 17/271; G06F 17/2775; G10L 15/18; G10L 15/1822; Y10S 707/99934
 USPC ......... 707/723, 708, 722, 769, 771; 704/257; 434/322
 See application file for complete search history.

(56) References Cited

U.S. PATENT DOCUMENTS

| | | | |
|---|---|---|---|
| 5,696,962 A | 12/1997 | Kupiec | |
| 5,715,468 A * | 2/1998 | Budzinski | G06F 17/27 704/9 |
| 7,269,545 B2 | 9/2007 | Agichtein et al. | |
| 7,461,047 B2 | 12/2008 | Masuichi et al. | |
| 8,543,565 B2 * | 9/2013 | Feng | G06F 17/30654 707/708 |
| 8,560,567 B2 * | 10/2013 | Azzam | G06Q 10/107 707/769 |
| 8,972,321 B2 * | 3/2015 | Ferrucci | G06N 7/005 706/46 |
| 2003/0093276 A1 * | 5/2003 | Miller | G10L 15/22 704/257 |

(Continued)

OTHER PUBLICATIONS

Hermjakob, et al., "Natural Language Based Reformulation Resource and Web Exploitation for Question Answering," TREC, 2002, 9 pages.

(Continued)

*Primary Examiner* — Dennis Truong
(74) *Attorney, Agent, or Firm* — Gibb & Riley, LLC

(57) ABSTRACT

A computer-implemented method of answering questions. A word problem is received into a user interface of a question-answering (QA) system operating on a computerized device having a processor. The word problem comprises a question and contextual phrases providing context for the question. The question is parsed from the word problem, using a parsing function of the processor. The contextual phrases are parsed from the word problem, using the parsing function of the processor. A type is identified for the question, using a typing function of the processor. A phrase is identified in the question having the same type as the question. A reformulated question is produced by replacing the phrase in the question having the same type as the question with a contextual phrase. The reformulated question is input to the QA system. Answers to the reformulated question are received from the QA system.

20 Claims, 8 Drawing Sheets

(56) References Cited

U.S. PATENT DOCUMENTS

| | | | | |
|---|---|---|---|---|
| 2004/0117352 | A1* | 6/2004 | Schabes | G06F 17/30684 |
| 2005/0108001 | A1* | 5/2005 | Aarskog | G06F 17/271 704/10 |
| 2006/0235689 | A1* | 10/2006 | Sugihara | G06F 17/2785 704/257 |
| 2009/0070311 | A1* | 3/2009 | Feng | G06F 17/30654 |
| 2013/0006641 | A1 | 1/2013 | Brown et al. | |
| 2013/0017523 | A1* | 1/2013 | Barborak | G09B 7/04 434/322 |
| 2014/0358890 | A1* | 12/2014 | Chen | G06F 17/30654 707/710 |
| 2015/0161241 | A1* | 6/2015 | Haggar | G06F 17/30654 707/723 |
| 2015/0261859 | A1* | 9/2015 | Isensee | G06F 17/30864 707/723 |

OTHER PUBLICATIONS

Read, et al., "Sentence Boundary Detection: A Long Solved Problem?," Proceedings of COLING 2012: Posters, Dec. 2012, pp. 985-994.

Tomuro, N., "Interrogative Reformulation Patterns and Acquisition of Question Paraphrases," Proceedings of the Second International Workshop on Paraphrasing, Jul. 2003, pp. 33-40.

Clark, et al., "Enabling Domain Experts to Convey Questions to a Machine: a Modified, Template-Based Approach," Proceedings of the 2nd International Conference on Knowledge Capture, 2003, pp. 13-19.

Woods, et al., "Halfway to Question Answering," TREC, 2000, 12 pages.

Murata, et al., "Universal Model for Paraphrasing—Using Transformation Based on a Defined Criteria—," arXiv preprint cs/0112005 (2001), 9 pages.

Agichtein, et al., "Learning Search Engine Specific Query Transformations for Question Answering," Proceedings of the 10th International Conference on World Wide Web, 2001, pp. 169-178.

Prager, et al., "Question-Answering by Predictive Annotation," SIGIR 2000, pp. 184-191.

Kanayama, et al., "Answering Yes/No Questions via Question Inversion," Proceedings of COLING 2012: Technical Papers, Dec. 2012, pp. 1377-1392.

Ferrucci, et al., "UIMA: An Architectural Approach to unstructured Information Processing in the Corporate Research Environment," To appear in a Special Issue of the Journal of Natural Language Engineering 2004, pp. 1-26.

Clarke, et al., "Exploiting Redundancy in Question Answering," SIGIR'01, Sep. 9-12, 2001, 8 pages.

Moldovan, et al., "The Structure and Performance of an Open-Domain Question answering System," In Proceedings of the Conference of the Association for Computational Linguistics, 2000, 8 pages.

Fan, et al., "Mining Knowledge from Large Corpora for Type Coercion in Question Answering," Web Scale Knowledge Extraction (WEKEX) Workshop at International Semantic Web Conference, 2011, 17 pages.

Wang, et al., "Relation Extraction with Relation Topics," Proceedings of the Conference on Empirical Methods in Natural Language Processing, Jul. 27-31, 2001, 11 pages.

Singh, Push, "The Public Acquisition of Commonsense Knowledge," Acquiring (and Using) Linguistic (and World) Knowledge for Information Access: Papers from the Aaai Spring Symposium. Technical Report SS-02-09. AAAI, pp. 1-6.

Kangavari, et.al., Information Retrieval: Improving Question Answering Systems by Query Reformulation and Answer Validation, World Academy of Science, Engineering and Technology 48, 2008, pp. 260-267.

* cited by examiner

SYSTEM AND METHOD FOR QUESTION ANSWERING BY REFORMULATING WORD PROBLEMS

BACKGROUND

The present disclosure relates to information retrieval, and more specifically, to a system and method to reformulate long natural language questions so they can be answered by a question-answering system.

Information retrieval (IR) deals with methods of returning relevant information or documents from a store of knowledge; question-answering (QA) specifically deals with returning information in response to natural language questions. A QA system discovers and evaluates potential answers and gathers and scores evidence for those answers from unstructured sources, such as natural language documents, and structured sources, such as relational databases and knowledge bases. The QA system uses a combination of techniques from computational linguistics, information retrieval, and knowledge representation for finding answers.

SUMMARY

Generally, systems and methods herein relate to question-answering (QA) systems. Systems and methods herein provide a technique for taking a natural language word problem type question and reformulating it into a shorter question that a QA system is better able to handle. In most word problem type questions, a scenario is described and there is a question posed at the end of the scenario; but, in order to answer the question, certain entities and inferences from the scenario are used. The scenario provides context for the actual question. Systems and methods herein take the word problem consisting of a scenario and a question, identify and extract the question, and then add entities and inferences from the scenario to reformulate the question, such that the reformulated question can be answered by a QA system. That is, the present disclosure provides a system and method for answering long questions by identifying the question and reformulating the question so that it can be answered by QA systems that are able to answer shorter questions.

According to a method herein, a word problem is received. The word problem comprises a question and contextual phrases providing context for the question. The question and the contextual phrases in the word problem are identified using a parsing function. First types for each phrase of the contextual phrases are identified. A referring phrase is identified in the question. A second type for the referring phrase is identified. It is determined if any of the first types matches the second type. A replacement phrase is created if any of the first types matches the second type. The replacement phrase comprises each phrase of the contextual phrases having a type that matches the second type. A reformulated question is produced by replacing the referring phrase in the question with the replacement phrase. The reformulated question is input to a question-answering (QA) system. Answers to the reformulated question are received from the QA system.

According to a method herein, a word problem comprising a first question and contextual phrases providing context for the first question is received. The first question is parsed from the word problem. A referring phrase is identified in the first question. The contextual phrases are parsed from the word problem. A reformulated question is produced by replacing the referral phrase in the first question with a replacement phrase based on the contextual phrases of the word problem. The reformulated question is input to a question-answering (QA) system. First answers to the reformulated question are received from the QA system. Each of the first answers has a confidence score. A missing link is identified in the first question. The missing link comprises at least one of the first answers that is related to the replacement phrase and has a confidence score below a predetermined value. A second question is created based on the missing link and the replacement phrase. The second question is input to the QA system. Second answers to the second question are received from the QA system.

According to a method herein, a word problem is received. The word problem is automatically divided into sentences using sentence boundary detection. A first question is identified from the word problem. Contextual phrases are identified from the word problem. The contextual phrases comprise a portion of the sentences and provide context for the question. First types for each phrase of the contextual phrases are identified. A referring phrase is identified in the first question. A second type is identified for the referring phrase. A replacement phrase is created. The replacement phrase comprises phrases of the contextual phrases having a type matching the second type. A reformulated question is produced by replacing the referring phrase in the first question with the replacement phrase. The reformulated question is input to a question-answering (QA) system. Answers to the reformulated question are received from the QA system. A second question is created by incorporating one or more answers to the reformulated question into the first question. The second question comprises one of an interrogative word question, a yes-no question, and a multiple-choice question.

BRIEF DESCRIPTION OF THE DRAWINGS

The systems and methods herein will be better understood from the following detailed description with reference to the drawings, which are not necessarily drawn to scale, and in which.

DETAILED DESCRIPTION

Figure 1:
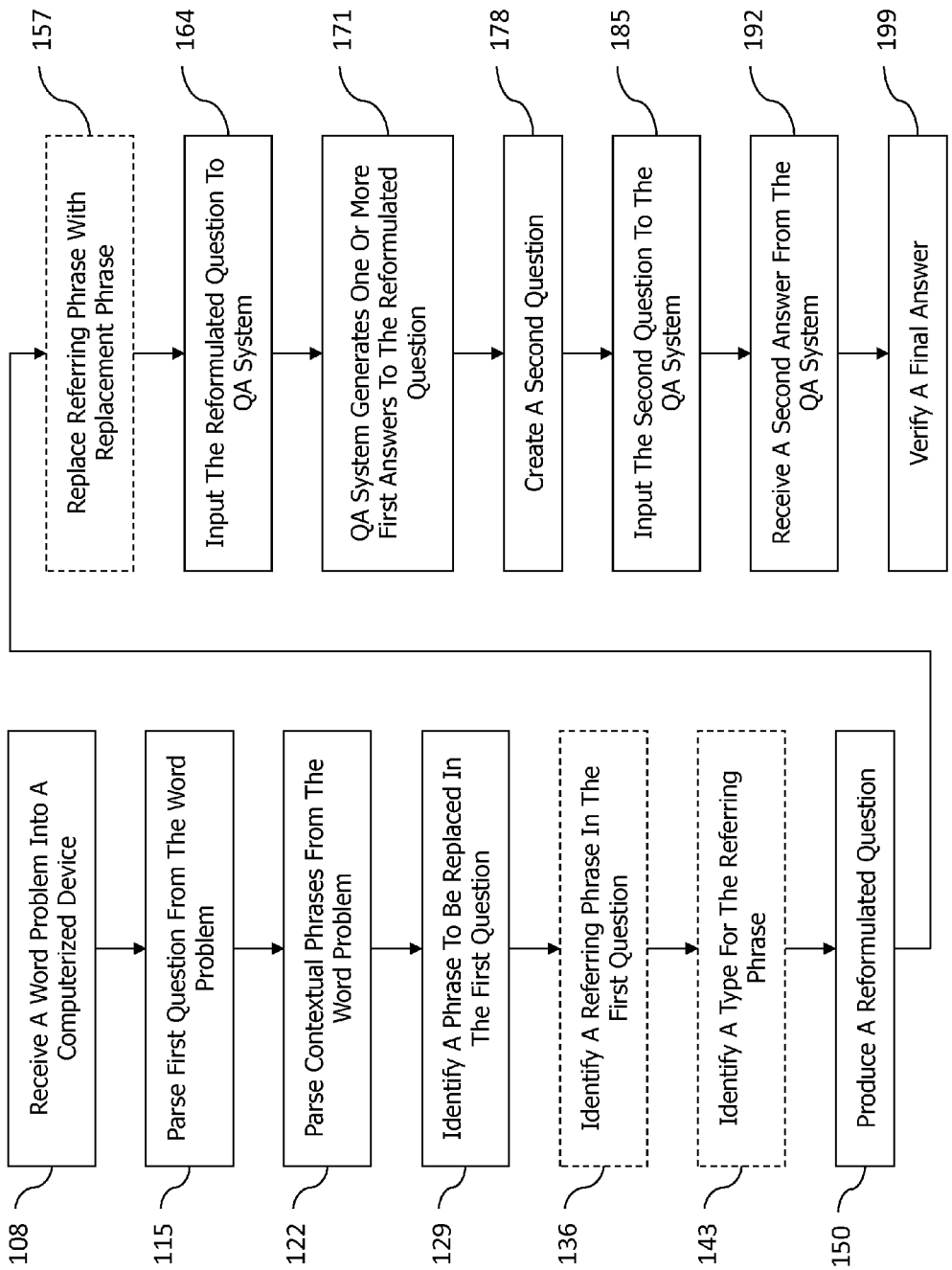
FIG. 1 is a flow diagram of a method according to systems and methods herein.

It will be readily understood that the systems and methods herein, as generally described and illustrated in the figures herein, may be arranged and designed in a wide variety of different configurations in addition to the described systems and methods. Thus, the following detailed description of the systems and methods herein, as represented in the figures, is not intended to limit the scope of the invention, as defined by the appended claims, but is merely representative of selected systems and methods. The following description is intended only by way of example, and simply illustrates certain selected systems and methods herein.

The QA system described herein is not merely a document search system. One difference between QA technology and simple document search technology is that document search typically takes a keyword query and merely returns a list of documents, ranked in order of relevance to the query. On the other hand, QA technology takes a question expressed in natural language, seeks to understand it in detail, and returns a precise answer to the question. A typical situation is for an end user to enter a question in natural language form, much as if they were asking another person, and for the system to sift through vast amounts of potential evidence to return a ranked list of the most compelling, precise answers. These answers may also include summaries of their justifying or supporting evidence, allowing the user to quickly assess the evidence and select the correct answer. Given sufficient search data, a document search can usually find documents or passages containing some keywords in common with the query, but lacks the precision, depth, and understanding necessary to deliver correct answers with accurate confidence.

While an Internet web search engine has access to an immense source of information and can quickly find relevant web pages given a small number of query terms, such a search engine does not generate precise answers to the query. A web search engine does not return answers; rather, it is designed to return a ranked list of web pages that the user may be trying to find.

A challenge for even finding the relevant documents is the issue of choosing the right set of keywords to retrieve those documents. Many questions contain information that is not critical for answering the question, but is provided for educational and/or entertainment purposes. Moreover, the question may use terms that are different from those used in evidence that may contain a correct answer. As a result, formulating an effective query that returns the relevant documents is a detailed and non-trivial task.

It is often the case that the information need is not well captured by the QA system, as the question processing part may fail to classify the question properly or the information needed for extracting and generating the answer is not easily retrieved. In such cases, the QA system may reformulate the question or request assistance from an outside source.

Generally, QA systems are better at answering short questions rather than long, complex questions. In most word problem style questions, a scenario is provided to give context to the question posed at the end of the scenario. The scenario is identified from contextual phrases in the word problem. In order to answer the question, certain entities and inferences from the scenario are used. Systems and methods herein take the word problem, consisting of a scenario and a question, identify and extract the question, and then add entities and inferences from the scenario into the question, such that the reformulated question can be answered by a QA system.

The present disclosure provides a system and method for answering long word problems by identifying the focus of the question and reformulating the query so that it can be answered by QA systems that are able to answer shorter questions.

According to systems and methods herein, sentence boundary detection may be used to automatically divide the word problem into sentences. A question is identified from the word problem. For example, if the last sentence of the word problem ends with a question mark, that is the question to be answered. The system identifies contextual phrases from the word problem. The contextual phrases of the word problem consist of all the sentences of the word problem, except the question. The system identifies a phrase in the question to be replaced. The system may also identify a type for the question.

Systems and methods herein utilize linguistic techniques to identify what kind of answer the system is seeking for the question presented. A type for the question may be computed from a natural language analysis of the query in order to provide more description of an answer than its ontological category. The type may simply comprise a word in the question that categorizes the answer required, independent of assigned semantics. Systems and methods herein also identify a referring phrase in the question a referring phrase is any noun phrase, or surrogate for a noun phrase, whose function is to identify specific entities in the word problem. The specific entities may be an individual person, place, object, or a set of persons, places, objects, etc. Once a referring phrase has been identified to the question, the reformulation process makes use of the type for the referring phrase to identify contextual phrases to insert in the reformulated question.

To identify the phrase in the question to be replaced, the question may be parsed using a syntactic parser. The parser may identify phrases of the form: Determiner+Noun (e.g., "this diagnosis", "her") and (Determiner Noun)'s Noun (e.g., "the patient's condition"). Any such phrase is the phrase to be replaced. The corresponding question type is the uninflected form of the last Noun; for example, the type of "the patient's symptoms" is "symptom". The phrase in the question to be replaced may also be called the referring phrase.

The system determines a replacement phrase to replace the referring phrase in the question with, based on the type of the referring phrase. The system may replace the referring phrase with one or more phrases from the contextual phrases of the word problem that are also of the same type. For example, if the word problem is "The patient has right lower quadrant pain and high fever. What condition explains the patient's symptoms?". The phrase to be replaced would be "the patient's symptoms". Its type="symptom". Contextual phrases of type "symptom" are "right lower quadrant pain" and "high fever." A reformulated question is produced by replacing the phrase in the question with a replacement phrase from the contextual phrases. Therefore, the question can be reformulated as "What condition explains right lower quadrant pain and high fever?".

The reformulated question can then be input to the QA portion of the system and answers to the reformulated question can be received from the QA portion of the system.

Referring now to the drawings, FIG. 1 is a flow diagram illustrating one non-limiting example of the systems and methods herein. According to FIG. 1, the disclosed method enables a computer-implemented method of answering questions. The first step of the method, at 108, involves receiving a word problem into a user interface of a computerized device. The word problem comprises a first question and contextual phrases providing context for the first question. The computerized device may be part of a QA system that uses question-answering processes and evidence passages to provide responses to questions. In the next step of the method, at 115, the first question is parsed from the word problem. Sentence boundary detection may be used to automatically divide the word problem into sentences. The first question may be in the form of a statement or an answer seeking an appropriate question. Next, at 122, the contextual phrases are parsed from the word problem. The contextual phrases comprise a portion of the sentences and provide context for the first question. At 129, a phrase to be replaced in the first question is identified. This may be done by identifying a referring phrase in the first question, at 136, and identifying a type for the referring phrase, at 143. A reformulated question is produced, at 150. This may be done by replacing the referring phrase in the first question with a replacement phrase of the same type, as shown at 157. The replacement phrase may be based on one or more contextual phrases from the word problem. At 164, the reformulated question is input to the QA system and, at 171, the QA system generates one or more first candidate answers to the reformulated question, with associated confidence scores based on results from scoring processes/algorithms for pieces of evidence extracted from a corpus of data. At 178, a second question is created based on the one or more first candidate answers and the replacement. The second question is input to the QA system, at 185. A second answer is received from the QA system, at 192. At 199, a final answer is verified based on the second answer.

According to a method herein, a word problem is received into a user interface of a system operating on a computerized device having a processor. The word problem comprises a question and contextual phrases providing context for the question. The question is parsed from the word problem, using a parsing function of the processor of the computerized device. The contextual phrases are parsed from the word problem, using the parsing function of the processor of the computerized device. A referring phrase is identified in the question, using the computerized device. A type is identified for the referring phrase, using a typing function of the processor of the computerized device. A reformulated question is produced by replacing the referring phrase in the question with a replacement phrase of the same type, using the computerized device. The replacement phrase is based on the contextual phrases. The reformulated question is input to a QA system, using the computerized device. Answers to the reformulated question are received from the QA system, using the computerized device.

According to a computer-implemented method of answering questions, a word problem is received into a system operating on a computerized device. The word problem comprises a first question and contextual phrases providing context for the first question. The first question is parsed from the word problem, using the computerized device. The contextual phrases are parsed from the word problem, using the computerized device. A reformulated question is produced by replacing a phrase in the first question with a replacement phrase based on the contextual phrases of the word problem, using the computerized device. The reformulated question is input to a QA system, using the computerized device. A first answer to the reformulated question is received from the QA system, using the computerized device. A second question is created, using the computerized device, based on the first answer and the contextual phrases. The second question is input to the QA system, using the computerized device. A second answer to the second question is received from the QA system, using the computerized device. The first answer is verified based on the second answer, using the computerized device.

According to a method of answering questions, a word problem is received into a system operating on a computerized device. Sentence boundary detection is used to automatically divide the word problem into sentences, using the computerized device. A question is identified from the word problem, using the computerized device. Contextual phrases are identified from the word problem, using the computerized device. The contextual phrases comprise a portion of the sentences and provide context for the question. A referring phrase is identified in the question, using the computerized device. The referring phrase refers to the contextual phrases. A type is identified for the referring phrase, using a typing function of the processor of the computerized device. A reformulated question is produced by replacing the referring phrase in the question with a replacement phrase of the same type, using the computerized device. The reformulated question is input to a QA system, using the computerized device. Answers to the reformulated question are received from the QA system, using the computerized device.

Figure 2:
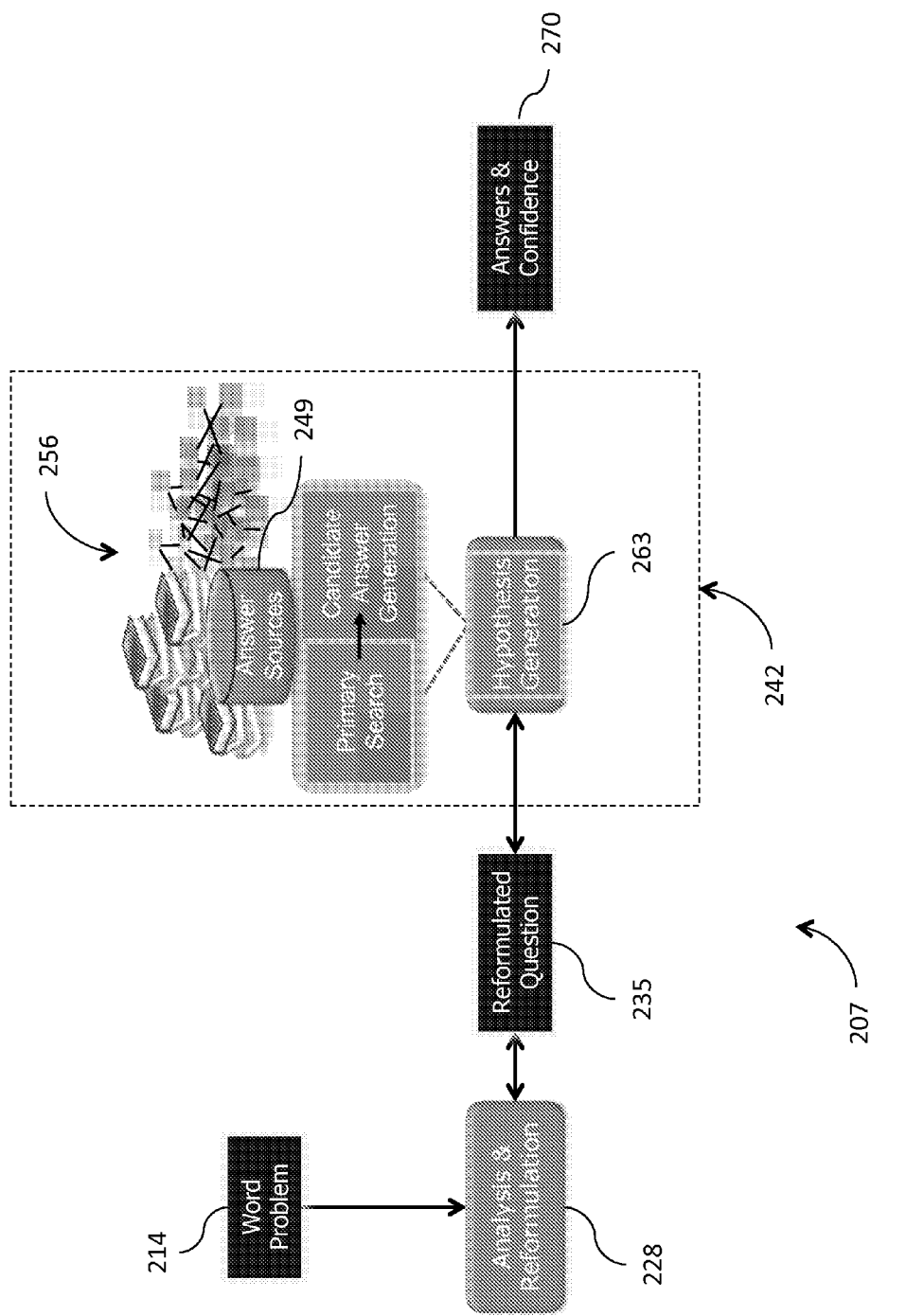
FIG. 2 is a schematic block diagram illustrating various aspects of systems and methods herein.

FIG. 2 illustrates one example of a system, indicated generally as 207, according to systems and methods herein. The system 207 receives a word problem 214 into a user interface. As described above, the word problem 214 comprises a question and contextual phrases providing context for the question. The system 207 includes a processor 228 that analyzes the word problem to generate a reformulated question 235 that is input to a search engine or question-answering (QA) system, indicated generally as 242. According to systems and methods herein, analysis of the word problem 214 may be performed in the processor 228 to determine precisely what the question is asking for. The methods and systems herein can execute queries to the QA system 242 with information extracted using natural language questions.

The QA system 242 generates and evaluates candidate answers using a variety of techniques. Each reformulated question 235 is input to the QA system 242, which automatically searches the Answer Sources 249. The Answer Sources 249 may include a corpus of data, indicated generally as 256, having structured and unstructured data from which to retrieve answers to the reformulated question 235.

Using the reformulated question 235, a Hypothesis Generator 263 issues a set of primary search queries against its corpus of data 256, which may include structured and unstructured data, to generate many possible candidate answers based on information in the corpus of data 256. The answer sources 249 could be websites, medical literature, clinical documents, and other sources of structured and/or unstructured information. Candidate answers to the reformulated question 235 are obtained from the answer sources 249 based on the query contents.

The retrieved results may be scored on a variety of measures of semantic match, medical relationship strength, and other criteria. Candidate responses may be scored based on medical knowledge in and from medical corpora, including books, web pages, and other text-based knowledge representations. A score may be determined for the candidate responses based on the degree of semantic match of the reformulated question 235. Another score may be determined for the candidate responses based on the strength of medical relationship of the passages to the reformulated question 235.

Outputs from the QA system 242 may include answers 270 to the reformulated question 235 as well as evidence profiles for the answers 270. The answers 270 may comprise entries from the corpus of data 256, which are related to the medical concepts and related entries from the corpus of data 256. In some cases, the output from the QA system may be returned to the processor 228 in order to generate another reformulated question 235.

Systems and methods herein identify the question from a word problem and reformulate the question so that it can be answered by question-answering systems that are able to answer shorter questions. There are several ways of reformulating the question:

(1) Substituting entities from the contextual phrases that give context to the scenario into the question.
(2) Substituting inferences (such as MISSING LINKS) from the scenario into the question.
(3) Incorporating one or more candidate answers into the question (to create WH-, YES-NO, or MULTIPLE CHOICE questions).

Referring again to FIG. 2, the QA system 242 receives a reformulated question 235 and searches a corpus of data 256 to extract pieces of evidence that are evaluated by a number of processes in order to generate candidate answers to the reformulated question 235. The corpus of data 256 includes quantities of digitally encoded, structured and unstructured information, such as fragments of documents, passages, internal or external knowledge bases, natural language documents, corporate intranets, reference books, textbooks, technical reports, blogs, etc. These lists are intended to be non-limiting examples of sources of information for the QA system 242. The vast majority of the corpus of data 256 comprises a wide variety of natural language text. Some of the data may be structured (formal knowledge bases) and some of the data may be semi-structured (tagged text) or unstructured (untagged text) in order to help interpret text and refine the answers 270.

For example, using the following word problem as input: "The patient has muscle pain, elevated kidney blood tests, and high blood pressure. What is the treatment for the patient's symptoms?" The processor 228 identifies the question, which is "What is the treatment for the patient's symptoms?" The processor 228 identifies "patient's symptoms" as the referring phrase in the question and determines one or more phrases from the contextual phrases in order to reformulate the question as: "What is the treatment for muscle pain, elevated kidney blood tests, and high blood pressure?" This reformulated question 235 is then input to the QA system 242 to determine candidate answers.

For each candidate answer generated, the QA system 242 evaluates a self-assessed probability that the candidate answer is a correct answer to the reformulated question 235, or in other words, the QA system 242 generates a confidence score for the candidate answer. In order to generate candidate answers, the QA system 242 analyzes the corpus of data 256 based on the reformulated question 235 in order to extract candidate answers, and computes a reliable confidence in light of whatever supporting or refuting pieces of evidence it finds. To obtain confidence in a candidate answer, the QA system 242 attempts to justify the answer by multiple sources in the corpus of data 256. The degree to which the probability that the candidate answer is a correct answer to the reformulated question 235 correlates to the confidence score for the candidate answer. The QA system 242 can then rank the candidate answers based on the confidence scores. In the above example word problem: "What is the treatment for muscle pain, elevated kidney blood tests, and high blood pressure?", the answer 270 that is output from the question answering system may be "prednisone".

The processor 228 may further identify the scenario of the word problem 214, based on contextual phrases in the word problem. The scenario is based on the referring phrase. The processor 228 may create a query based on the contextual phrases and input that query to the QA system. Based on answers to the query, the processor 228 then infer a phrase for the scenario, and reformulates the word problem 214 by incorporating the phrase into the reformulated question 214. Using the same example word problem as input: "The patient has muscle pain, elevated kidney blood tests, and high blood pressure. What is the treatment for the patient's symptoms?" The processor 228 identifies the question, which is "What is the treatment for the patient's symptoms?" Note: the question is looking for a treatment based on symptoms. The processor 228 identifies the scenario from contextual phrases in the word problem, which is "The patient has muscle pain, elevated kidney blood tests, and high blood pressure". The processor 228 may create a query based on the contextual phrases to determine the patient's disease. For example, the query may be "What disease is represented by muscle pain, elevated kidney blood tests, and high blood pressure?". The query is input to the QA system 242, which infers the phrase "polyarteritis nodosa" from the scenario of symptoms. The processor 228 then reformulates the question as: "What is the treatment for polyarteritis nodosa?". This question is then input to the hypothesis generator 263 to determine candidate answers.

The QA system 242 may generate follow-on inquiries to verify the answer 270. The QA system 242 may use the follow-on inquiries to enhance the internal knowledge base of the QA system 242 and improve the confidence in the candidate answers. Again, using the same example word problem as input: "The patient has muscle pain, elevated kidney blood tests, and high blood pressure. What is the treatment for the patient's symptoms?" The QA system 242 may identify "prednisone" as a candidate answer. The processor 228 then creates a verification question, such as: "Is prednisone the treatment for muscle pain, elevated kidney blood tests, and high blood pressure?" The verification question may include one or more of the candidate answers. The verification question is then input to the hypothesis generator 263. It would be expected that the QA system 242 would provide a verification answer, such as "Yes, prednisone is the treatment for muscle pain, elevated kidney blood tests, and high blood pressure." Therefore, "prednisone" would be the answer 270 that is output from the QA system 242.

In some systems and methods herein, the system 207 may take a word problem 214 as input, identify the question, identify the scenario of the question based on contextual phrases in the word problem, infer a phrase from the scenario, and obtain candidate answers. Then, take a candidate answer as input, create a verification question by incorporating a contextual phrase from the scenario into the verification question, and incorporate the candidate answer into the verification question. The verification question is then fed into the QA system 242, which produces a final answer as output.

For example, using the same word problem as input: "The patient has muscle pain, elevated kidney blood tests, and high blood pressure. What is the treatment for the patient's symptoms?" The processor 228 identifies the question, which is "What is the treatment for the patient's disease?" The processor 228 identifies the scenario of the word problem 214 based on contextual phrases in the word problem 214, which is "The patient has muscle pain, elevated kidney blood tests, and high blood pressure". The processor 228 may input the contextual phrases to the QA system 242 to determine the patient's disease. The QA system 242 infers the phrase "polyarteritis nodosa" from the scenario of symptoms. The processor 228 reformulates the question as: "What is the treatment for polyarteritis nodosa?" The QA system 242 may identify "prednisone" as a candidate answer. The processor 228 then creates a verification question, such as: "Is prednisone the treatment for polyarteritis nodosa?" This verification question is then input to the hypothesis generator 263. It would be expected that the QA system 242 would provide a verification answer, such as: "Yes, prednisone is the treatment for polyarteritis nodosa." Therefore, "prednisone" would be the answer 270 that is output from the QA system 242.

The above techniques may be used to formulate compound questions. For example, the processor 228 may identify the scenario of the word problem 214 based on contextual phrases in the word problem 214, infer one or more phrases from the scenario, and reformulate the question by incorporating one or more phrases into the reformulated question. An example of a reformulated question is: "What is the treatment for polyarteritis nodosa or renal failure or elevated cholesterol?" One or more candidate answers can then be used as input to the QA system 242 for creating the verification question by incorporating one or more candidate answers into the verification question. An example of such a verification question is: "Is prednisone or heparin or promethazine the treatment for muscle pain, elevated kidney blood tests, and high blood pressure?"

According to systems and methods herein, a system may include a processor, a user interface connected to the processor, and a QA system having a corpus of data connected to the processor. The QA system may be of the type capable of producing evidence in support of a candidate answer. A word problem to be answered by the QA system is provided through the user interface. The processor identifies a first question from the word problem using a parsing function of the processor. The processor identifies contextual phrases from the word problem using the parsing function of the processor. The contextual phrases provide a scenario for the first question, based on the context. The first question is analyzed to identify the focus of the question, and to identify a referring phrase in the first question. The referring phrase is typed using a typing function of the processor. Based on the focus of the question, the processor identifies a replacement phrase for the first question having the same type as the referring phrase. The processor produces a reformulated question based on the first question by replacing the referring phrase in the first question with the replacement phrase, which may comprise one or more contextual phrases. The processor inputs the reformulated question to the QA system, which searches a corpus of data and creates a collection of candidate answers to the reformulated question from the corpus of data. Each candidate answer may have supporting evidence and a score generated by the QA system. The QA system returns a candidate answer to the processor, which creates a second question based on the candidate answers and the contextual phrases that provide the scenario for the first question. The QA system produces second answers to the second question from the corpus of data. The processor verifies the candidate answers to the reformulated question based on the second answers provided to the second question. The system can be scaled up or down depending on different application specifications.

According to a further system and method herein, an article of manufacture is provided that includes a tangible computer readable medium having computer readable instructions embodied therein for performing the steps of the computer implemented methods, including, but not limited to, the method illustrated in FIG. 1. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 1.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various functions if with various programs installed therein.

Figure 3:
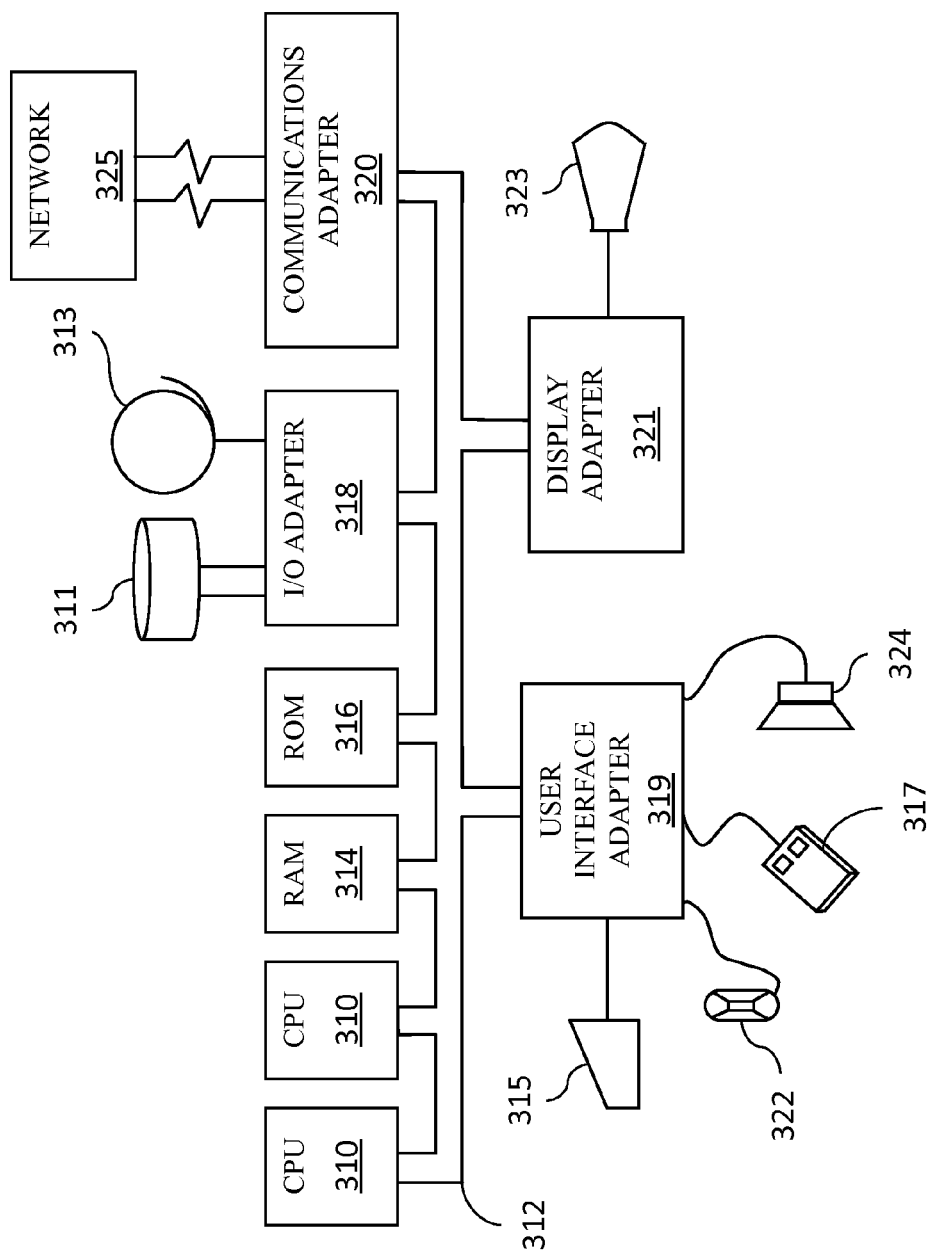
FIG. 3 is a schematic diagram of a hardware system according to systems and methods herein.

A representative hardware environment for practicing the systems and methods herein is depicted in FIG. 3. This schematic drawing illustrates a hardware configuration of an information handling/computer system in accordance with the systems and methods herein. The system comprises at least one processor or central processing unit (CPU) 310. The CPUs 310 are interconnected via system bus 312 to various devices such as a Random Access Memory (RAM) 314, Read-Only Memory (ROM) 316, and an Input/Output (I/O) adapter 318. The I/O adapter 318 can connect to peripheral devices, such as disk units 311 and tape drives 313, or other program storage devices that are readable by the system. The system can read the inventive instructions on the program storage devices and follow these instructions to execute the methodology of the systems and methods herein.

In FIG. 3, CPUs 310 perform various processing based on a program stored in a Read-Only Memory (ROM) 316 or a program loaded from a peripheral device, such as disk units 311 and tape drives 313 to a Random Access Memory (RAM) 314. In the RAM 314, required data when the CPUs 310 perform the various processing or the like is also stored, as necessary. The CPUs 310, the ROM 316, and the RAM 314 are connected to one another via a bus 312. An I/O adapter 318 is also connected to the bus 312 to provide an input/output interface, as necessary. A removable medium, such as a magnetic disk, an optical disk, a magneto-optical disk, a semiconductor memory, or the like, is installed on the peripheral device, as necessary, so that a computer program read therefrom may be installed into the RAM 314, as necessary.

The system further includes a user interface adapter 319 that connects a keyboard 315, mouse 317, speaker 324, microphone 322, and/or other user interface devices such as a touch screen device (not shown) to the bus 312 to gather user input. Additionally, a communication adapter 320 including a network interface card such as a LAN card, a modem, or the like connects the bus 312 to a data processing network 325. The communication adapter 320 performs communication processing via a network such as the Internet. A display adapter 321 connects the bus 312 to a display device 323, which may be embodied as an output device such as a monitor (such as a Cathode Ray Tube (CRT), a Liquid Crystal Display (LCD), or the like), printer, or transmitter, for example.

In the case where the above-described series of processing is implemented with software, the program that constitutes the software may be installed from a network such as the Internet or a storage medium such as the removable medium.

Those skilled in the art would appreciate that the storage medium is not limited to the peripheral device having the program stored therein as illustrated in FIG. 3, which is distributed separately from the device for providing the program to the user. Examples of a removable medium include a magnetic disk (including a floppy disk), an optical disk (including a Compact Disk Read-Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 316, a hard disk contained in the storage section of the disk units 311, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read-Only Memory (ROM), an Erasable Programmable Read-Only Memory (EPROM or Flash memory), an optical fiber, a magnetic storage device, a portable Compact Disc Read-Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server, and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Alternatively, the process software is sent directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

While it is understood that the process software may be deployed by manually loading directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

Figure 4:
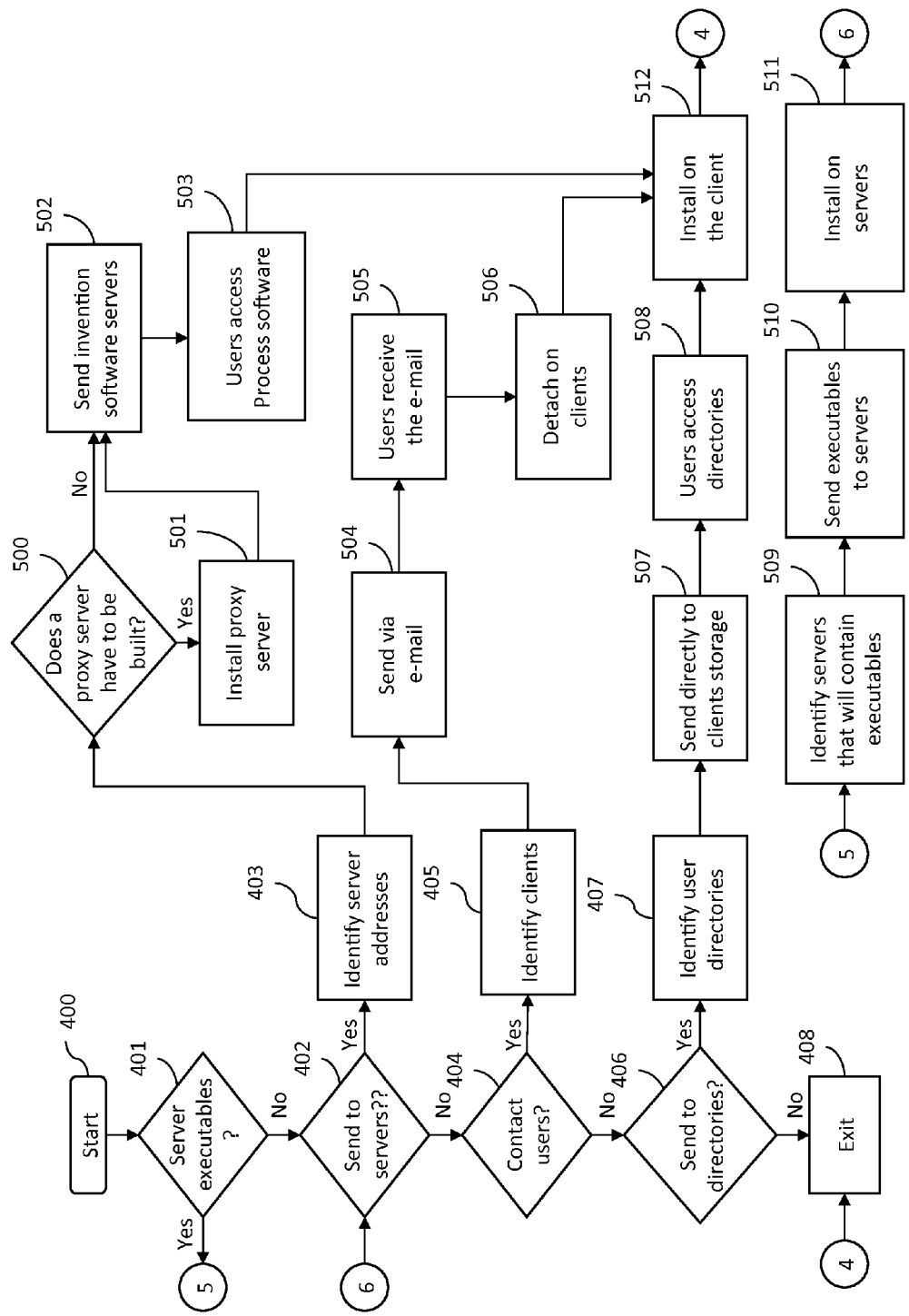
FIG. 4 is a schematic diagram of a deployment system according to systems and methods herein.

In FIG. 4, step 400 begins the deployment of the process software. The first thing is to determine if there are any programs that will reside on a server or servers when the process software is executed 401. If this is the case, then the servers that will contain the executables are identified 509. The process software for the server or servers is transferred directly to the servers' storage via FTP or some other protocol, or by copying through the use of a shared file system 510. The process software is then installed on the servers 511.

Next, a determination is made on whether the process software is to be deployed by having users access the process software on a server or servers 402. If the users are to access the process software on servers, then the server addresses that will store the process software are identified 403.

A determination is made if a proxy server is to be built 500 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed 501. The process software is either sent to the servers via a protocol such as FTP or it is copied directly from the source files to the server files via file sharing 502. Another method would be to send a transaction to the servers that contain the process software and have the server process the transaction, then receive and copy the process software to the server's file system. Once the process software is stored at the servers, the users, via their client computers, then access the process software on the servers and copy it to their client computers' file systems 503. Another method is to have the servers automatically copy the process software to each client and then run the installation program for the process software at each client computer. The users execute the program that installs the process software on their client computer 512, and then exit the process 408.

In step 404, a determination is made whether the process software is to be deployed by sending the process software to users via e-mail. The set of users where the process software will be deployed are identified together with the addresses of the user client computers 405. The process software is sent via e-mail 504 to each of the users' client computers. The users receive the e-mail 505 and then detach the process software from the e-mail to a directory on their client computers 506. The users execute the program that installs the process software on their client computer 512, and then exit the process 408.

Lastly, a determination is made on whether the process software will be sent directly to user directories on their client computers 406. If so, the user directories are identified 407. The process software is transferred directly to the users' client computer directory 507. This can be done in several ways such as, but not limited to, sharing of the file system directories and then copying from the sender's file system to the recipient users' file system or alternatively using a transfer protocol such as File Transfer Protocol (FTP). The users access the directories on their client file systems in preparation for installing the process software 508. The users execute the program that installs the process software on their client computer 512, and then exit the process 408.

The process software is integrated into a client, server, and network environment by providing for the process software to coexist with applications, operating systems, and network operating systems software, and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems will be identified and compared to the list of operating systems, version numbers, and network software that have been tested to work with the process software. Those operating systems, version numbers, and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 5:
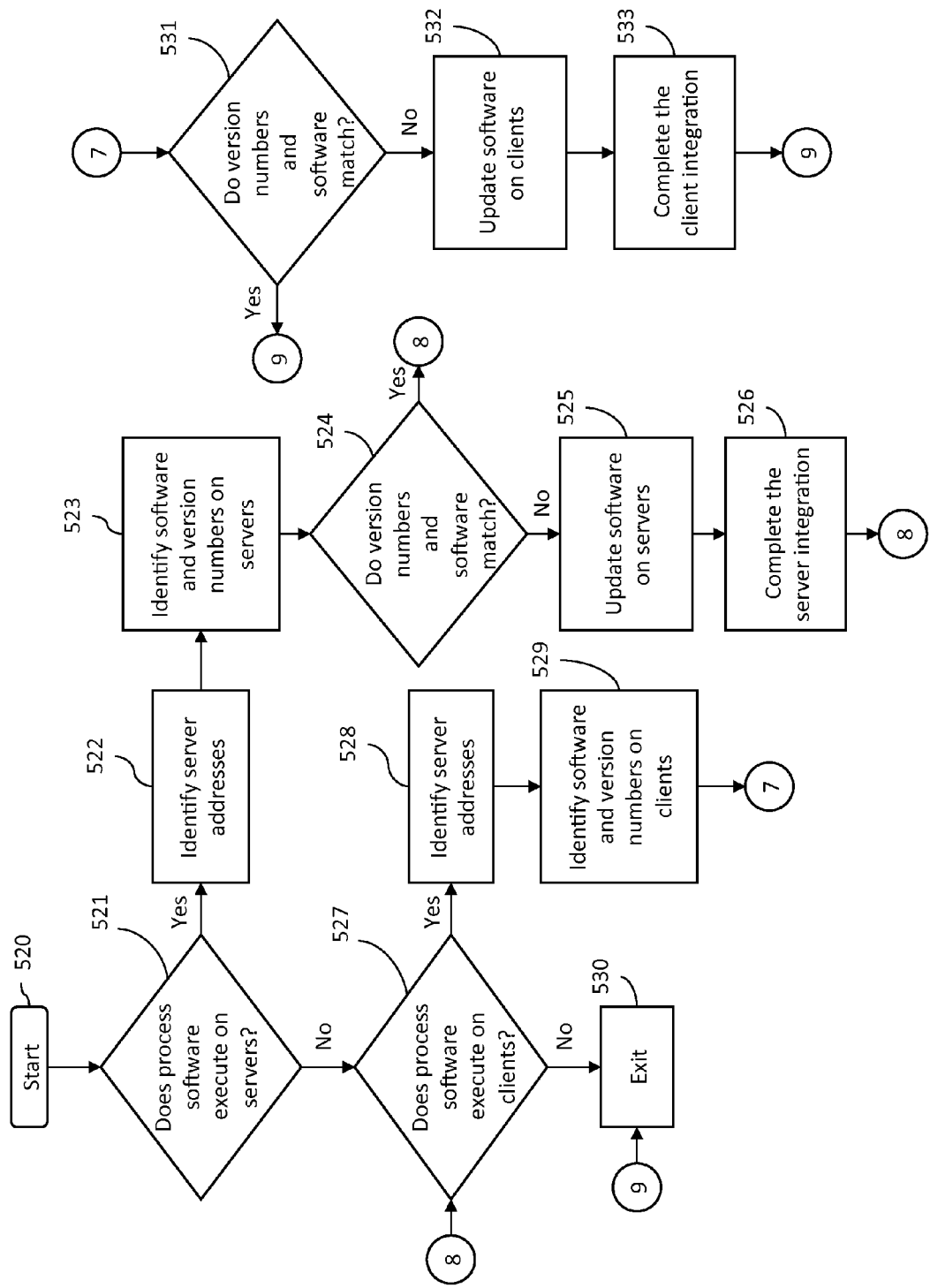
FIG. 5 is a schematic diagram of an integration system according to systems and methods herein.

In FIG. 5, step 520 begins the integration of the process software. The first thing is to determine if there are any process software programs that will execute on a server or servers 521. If this is not the case, then integration proceeds to 527. If this is the case, then the server addresses are identified 522. The servers are checked to see if they contain software that includes the operating system (OS), applications, and network operating systems (NOS), together with their version numbers that have been tested with the process software 523. The servers are also checked to determine if there is any missing software that is required by the process software 523.

A determination is made if the version numbers match the version numbers of OS, applications, and NOS that have been tested with the process software 524. If all of the versions match and there is no missing required software, the integration continues in 527.

If one or more of the version numbers do not match, then the unmatched versions are updated on the server or servers with the correct versions 525. Additionally, if there is missing required software, then it is updated on the server or servers 525. The server integration is completed by installing the process software 526.

Step 527, which follows either step 521, 524, or 526, determines if there are any programs of the process software that will execute on the clients. If no process software programs execute on the clients, the integration proceeds to 530 and exits. If this is not the case, then the client addresses are identified at 528.

The clients are checked to see if they contain software that includes the operating system (OS), applications, and network operating systems (NOS), together with their version numbers that have been tested with the process software 529. The clients are also checked to determine if there is any missing software that is required by the process software 529.

A determination is made as to whether the version numbers match the version numbers of OS, applications, and NOS that have been tested with the process software 531. If all of the versions match and there is no missing required software, then the integration proceeds to 530 and exits.

If one or more of the version numbers do not match, then the unmatched versions are updated on the clients with the correct versions 532. In addition, if there is missing required software then it is updated on the clients 532. Installing the process software on the clients 533 completes the client integration. The integration proceeds to 530 and exits.

The process software is shared, simultaneously serving multiple customers in a flexible, automated fashion. It is standardized, requiring little customization, and it is scalable, providing capacity On-Demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc. approach a capacity so as to affect performance, additional network bandwidth, memory usage, storage, etc., are added to share the workload.

The measurements of use that are used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider.

In another method, the service provider requests payment directly from a customer account at a banking or financial institution.

In another method, if the service provider is also a customer of the customer that uses the process software application, the payment owed to the service provider is reconciled to the payment owed by the service provider to minimize the transfer of payments.

Figure 6:
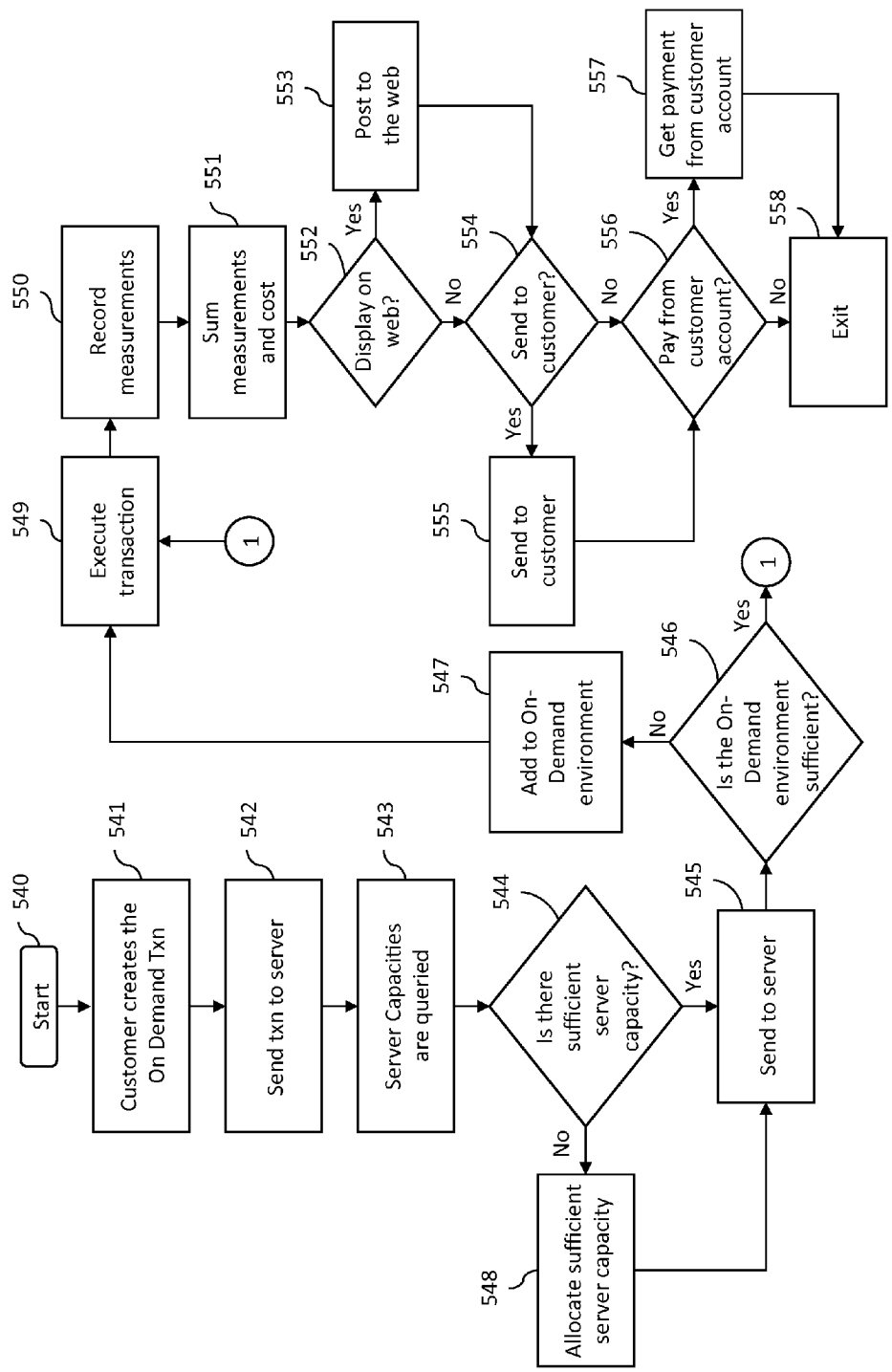
FIG. 6 is a schematic diagram of an on-demand system according to systems and methods herein.

In FIG. 6, step 540 begins the On-Demand process. A transaction is created that contains the unique customer identification, the requested service type, and any service parameters that further specify the type of service 541. The transaction is then sent to the main server 542. In an On-Demand environment, the main server can initially be the only server, then, as capacity is consumed, other servers are added to the On-Demand environment.

The server central processing unit (CPU) capacities in the On-Demand environment are queried 543. The CPU requirement of the transaction is estimated, and then the servers' available CPU capacity in the On-Demand environment is compared to the transaction CPU requirement to see if there is sufficient CPU capacity available in any server to process the transaction 544. If there is not sufficient server CPU capacity available, then additional server CPU capacity is allocated to process the transaction 548. If there was already sufficient CPU capacity available, then the transaction is sent to a selected server 545.

Before executing the transaction, a check is made of the remaining On-Demand environment to determine if the environment has sufficient available capacity for processing the transaction. This environment capacity consists of such things as, but not limited to, network bandwidth, processor memory, storage etc. 546. If there is not sufficient available capacity, then capacity will be added to the On-Demand environment 547. Next, the required software to process the transaction is accessed, loaded into memory, and then the transaction is executed 549.

The usage measurements are recorded 550. The usage measurements consist of the portions of those functions in the On-Demand environment that are used to process the transaction. The usage of such functions as, but not limited to, network bandwidth, processor memory, storage, and CPU cycles are what are recorded. The usage measurements are summed, multiplied by unit costs, and then recorded as a charge to the requesting customer 551. If the customer has requested that the On-Demand costs be posted to a web site 552, then they are posted 553.

If the customer has requested that the On-Demand costs be sent via e-mail to a customer address 554, then they are sent 555. If the customer has requested that the On-Demand costs be paid directly from a customer account 556, then payment is received directly from the customer account 557. The last step is to exit the On-Demand process 558.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed, and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed, and executed through the use of dedicated equipment and large-scale encryption, which are used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Figure 7:
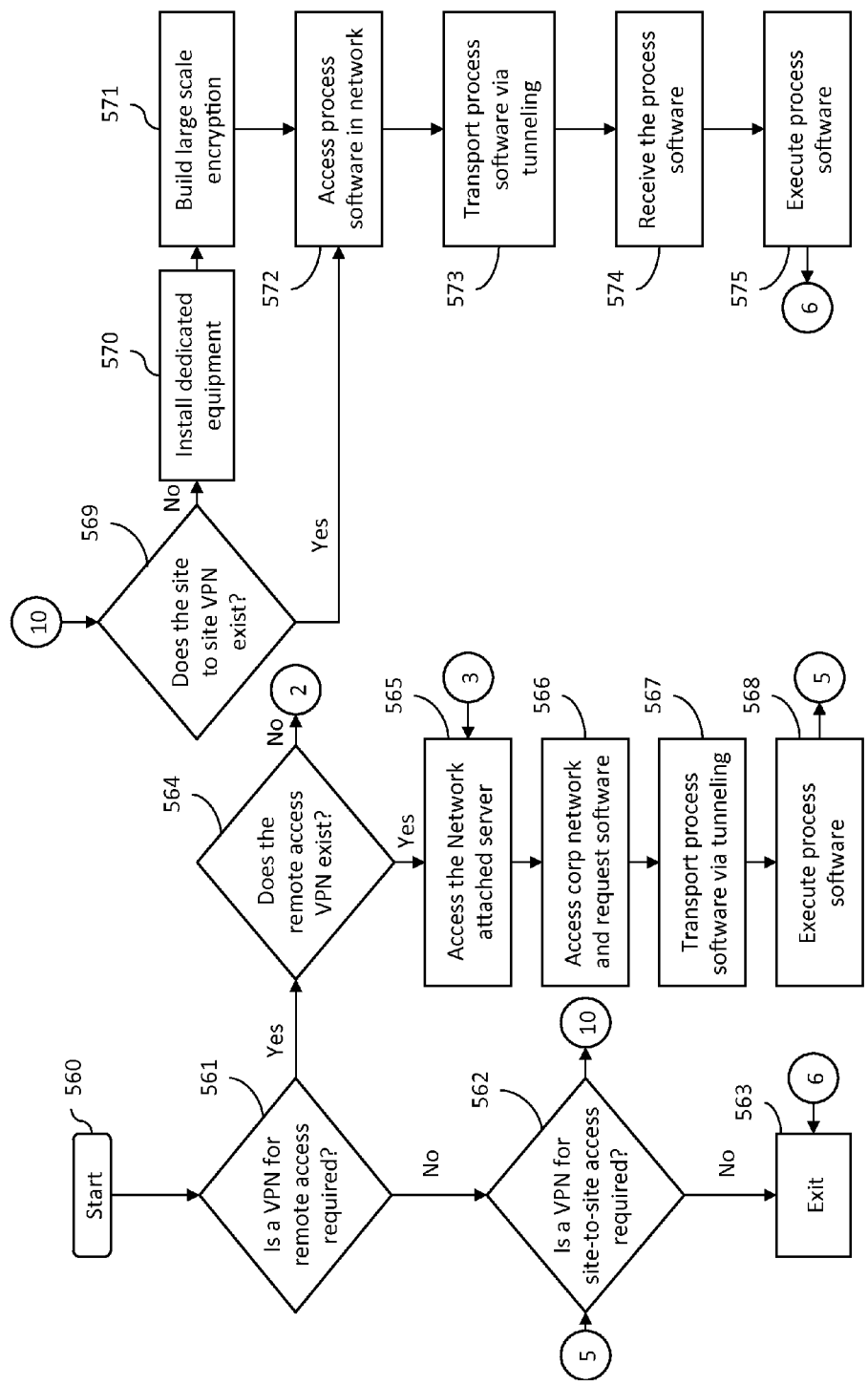
FIG. 7 is a schematic diagram of a virtual private network system according to systems and methods herein.
Figure 8:
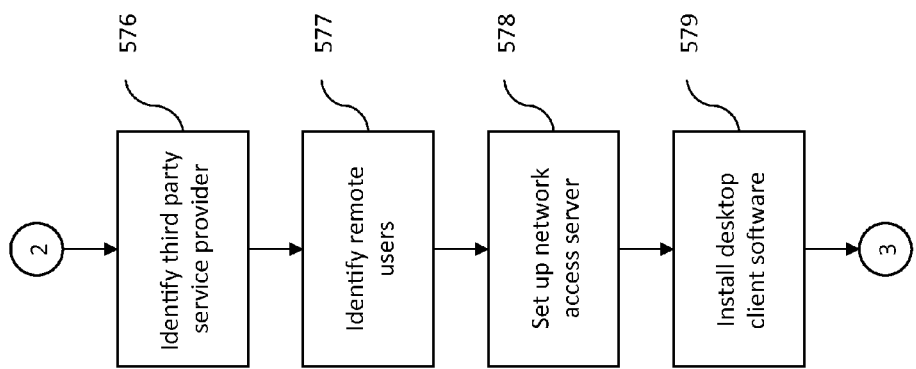
FIG. 8 is a schematic diagram of a virtual private network system according to systems and methods herein.

In FIGS. 7 and 8, step 560 begins the Virtual Private Network (VPN) process. A determination is made to see if a VPN for remote access is required 561. If it is not required, then proceed to 562. If it is required, then determine if the remote access VPN exists 564.

If it does exist, then proceed to 565. Otherwise, identify the third party provider that will provide the secure, encrypted connections between the company's private network and the company's remote users 576. The company's remote users are identified 577. The third party provider then sets up a network access server (NAS) 578 that allows the remote users to dial a toll-free number or attach directly via a cable or DSL modem to access, download, and install the desktop client software for the remote-access VPN 579.

After the remote access VPN has been built, or if it been previously installed, the remote users can then access the process software by dialing into the NAS or attaching directly via a cable or DSL modem into the NAS 565. This allows entry into the corporate network where the process software is accessed 566. The process software is transported to the remote users' desktop over the network via tunneling. That is, the process software is divided into packets and each packet, including the data and protocol, is placed within another packet 567. When the process software arrives at the remote users' desktop, it is removed from the packets, reconstituted, and executed on the remote users' desktop 568.

A determination is made to see if a VPN for site-to-site access is required 562. If it is not required, then proceed to exit the process 563. Otherwise, determine if the site-to-site VPN exists 569. If it does exist, then proceed to 572. Otherwise, install the dedicated equipment required to establish a site-to-site VPN 570. Then build the large-scale encryption into the VPN 571.

After the site-to-site VPN has been built, or if it had been previously established, the users access the process software via the VPN 572. The process software is transported to the site users over the network via tunneling 573. That is, the process software is divided into packets and each packet, including the data and protocol, is placed within another packet 574. When the process software arrives at the remote users' desktop, it is removed from the packets, reconstituted, and executed on the site users' desktop 575. Proceed to exit the process 563.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The corresponding structures, materials, acts, and equivalents of all means or step plus function elements in the claims below are intended to include any structure, material, or act for performing the function in combination with other claimed elements as specifically claimed. The descriptions of the various systems and methods herein have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

What is claimed is:

1. A method comprising:
   receiving a word problem comprising a question and contextual phrases providing context for said question;
   identifying said question and said contextual phrases in said word problem using a parsing function;
   identifying first types for each phrase of said contextual phrases;
   identifying a referring phrase in said question;
   identifying a second type for said referring phrase;
   determining if any of said first types matches said second type;
   creating a replacement phrase if any of said first types matches said second type, said replacement phrase comprising each phrase of said contextual phrases having a type matching said second type;
   producing a reformulated question by replacing said referring phrase in said question with said replacement phrase;
   inputting said reformulated question to a question-answering (QA) system; and
   receiving answers to said reformulated question from said QA system.

2. The method of claim 1, further comprising:
   if said first types do not match said second type, forming a query based on said contextual phrases;
   inputting said query to said QA system;
   receiving an answer from said QA system;
   identifying a third type for said answer;

determining if said third type matches said second type; and producing a reformulated question by replacing said referring phrase in said question with said answer if said third type matches said second type.

3. The method according to claim 1, said identifying said question and said contextual phrases in said word problem comprising:
dividing said word problem into sentences using sentence boundary detection; and
identifying said question as a sentence ending with a question mark.

4. The method according to claim 1, said identifying said question and said contextual phrases in said word problem comprising:
identifying said contextual phrases using named entity recognition.

5. The method of claim 1, further comprising:
dividing said word problem into sentences;
identifying said contextual phrases from said word problem, said contextual phrases comprising a portion of said sentences.

6. The method of claim 1, further comprising:
creating a verification question based on said answers to said reformulated question and said replacement phrase;
inputting said verification question to said QA system;
receiving from said QA system verification answers to said verification question; and
verifying said answers to said reformulated question based on said verification answers to said verification question.

7. A method comprising:
receiving a word problem comprising a first question and contextual phrases providing context for said first question;
parsing said first question from said word problem;
identifying a referring phrase in said first question;
parsing said contextual phrases from said word problem;
identifying types for each phrase of said contextual phrases;
identifying a type for said referring phrase;
producing a reformulated question by replacing, said referral phrase in said first question with a replacement phrase said replacement phrase comprising phrases of said contextual phrases having types for each phrase of said contextual phrases matching said type for said referring phrase;
inputting said reformulated question to a question-answering (QA) system;
receiving from said QA system first answers to said reformulated question, each of said first answers having a confidence score;
identifying a missing link in said first question, said missing link comprising at least one of said first answers being related to said replacement phrase and having a confidence score below a predetermined value;
creating a second question based on said missing link and said replacement phrase;
inputting said second question to said QA system; and receiving from said QA system second answers to said second question.

8. The method of claim 7, further comprising:
identifying first types for said first answers; and
identifying a second type for said first question,
said missing link comprising at least one of said first answers being related to said replacement phrase and having a type different from said second type.

9. The method according to claim 7, said parsing said first question from said word problem comprising:
dividing said word problem into sentences using sentence boundary detection; and
identifying said first question as a sentence ending with a question mark.

10. The method according to claim 7, said parsing said contextual phrases from said word problem comprising:
identifying said contextual phrases using named entity recognition.

11. The method according to claim 7, said producing a reformulated question further comprising:
identifying third types for each phrase of said contextual phrases;
identifying a fourth type for said referring phrase;
creating said replacement phrase, based on said fourth type for said referring phrase and said third types for each phrase of said contextual phrases; and
producing a reformulated question by replacing said referring phrase in said first question with a replacement phrase of the same type.

12. The method of claim 7, further comprising:
dividing said word problem into sentences;
identifying said contextual phrases from said word problem, said contextual phrases comprising a portion of said sentences; and
producing said reformulated question based on said first question and said contextual phrases.

13. The method of claim 7, further comprising:
creating a verification question based on said second answers to said second question;
inputting said verification question to said QA system;
receiving from said QA system verification answers to said verification question; and
verifying said second answers to said second question based on said verification answers to said verification question.

14. A method comprising; receiving a word problem;
using sentence boundary detection, automatically dividing said word problem into sentences;
identifying a first question from said word problem;
identifying contextual phrases from said word problem, said contextual phrases comprising a portion of said sentences and providing context for said question;
identifying first types for each phrase of said contextual phrases;
identifying a referring phrase in said first question;
identifying a second type for said referring phrase;
creating a replacement phrase comprising phrases of said contextual phrases having first type matching said second type;
producing a reformulated question by replacing said referring phrase in said first question with said replacement phrase;
inputting said reformulated question to a question-answering (QA) system;
receiving answers to said reformulated question from said QA system; and
creating a second question by incorporating one or more answers to said reformulated question into said first question, said second question comprising one of: an interrogative word question, a yes-no question, and a multiple-choice question.

15. The method according to claim 14, said identifying a first question from said word problem comprising:
identifying said first question as a sentence ending with a question mark.

16. The method according to claim 14, said identifying contextual phrases from said word problem comprising:
   identifying said contextual phrases using named entity recognition.

17. The method according to claim 14, further comprising:
   receiving from said QA system first answers to said reformulated question, each of said first answers having a confidence score;
   identifying a missing link in said first question, said missing link comprising at least one of said first answers being related to said replacement phrase and having a confidence score below a predetermined value;
   creating a third question based on said missing link and said replacement phrase;
   inputting said third question to said QA system; and
   receiving from said QA system third answers to said third question, said second question incorporating one or more answers to said third question into said first question.

18. The method of claim 17, further comprising:
   identifying first types for said first answers; and
   identifying a second type for said first question,
   said missing link comprising at least one of said first answers being related to said replacement phrase and having a type different from said second type.

19. The method of claim 14, said interrogative word question comprising one of:
   a what question, a when question, a where question, a who question, a why question, and a how question.

20. The method of claim 14, said word problem comprising a natural language query.

* * * * *